(12) United States Patent  
Nagao et al.

(10) Patent No.: US 7,896,379 B2  
(45) Date of Patent: Mar. 1, 2011

(54) MOTORCYCLES HAVING UPPER AND LOWER ARMS COUPLED WITH FORK AND FRAME

(75) Inventors: Daisuke Nagao, Long Beach, CA (US); Kenji Tamura, Redondo Beach, CA (US); Philip Tsiaras, Hanover, NH (US)

(73) Assignee: Honda Motor Company, Ltd., Tokyo (JP)

( * ) Notice: Subject to any disclaimer, the term of this patent is extended or adjusted under 35 U.S.C. 154(b) by 200 days.

(21) Appl. No.: 12/254,885

(22) Filed: Oct. 21, 2008

(65) Prior Publication Data

US 2010/0096207 A1 Apr. 22, 2010

(51) Int. Cl.  
B62K 25/24 (2006.01)

(52) U.S. Cl. ...................................... 280/276

(58) Field of Classification Search ............... 280/276, 280/277; 180/219  
See application file for complete search history.

(56) References Cited

U.S. PATENT DOCUMENTS

| | | | |
|---|---|---|---|
| 4,388,978 A * | 6/1983 | Fior | 180/219 |
| 4,401,316 A | 8/1983 | Miyakoshi et al. | |
| 4,433,851 A | 2/1984 | Miyakoshi et al. | |
| 4,444,406 A | 4/1984 | Isono | |
| 4,570,963 A | 2/1986 | Isono | |
| 4,807,898 A | 2/1989 | Huntly | |
| 4,828,069 A * | 5/1989 | Hatsuyama | 180/219 |
| 5,069,303 A | 12/1991 | Fuller | |
| 5,186,074 A | 2/1993 | Arnold | |
| 5,299,820 A | 4/1994 | Lawwill | |
| 5,441,291 A | 8/1995 | Girvin, III | |
| 5,462,302 A | 10/1995 | Leitner | |
| 5,511,444 A * | 4/1996 | Clausen et al. | 74/551.2 |
| 5,626,355 A | 5/1997 | Voss et al. | |
| 5,743,547 A | 4/1998 | Voss et al. | |
| 5,749,590 A | 5/1998 | Roerig | |
| 6,155,370 A * | 12/2000 | Iwai et al. | 180/222 |
| 6,263,994 B1 | 7/2001 | Eitel | |
| 6,485,043 B2 | 11/2002 | Ito et al. | |
| 6,910,702 B1 | 6/2005 | Hals | |
| 7,699,330 B2 * | 4/2010 | Chen | 280/276 |
| 7,744,107 B2 * | 6/2010 | Chen | 280/276 |

FOREIGN PATENT DOCUMENTS

CH 650742 A5 * 8/1985

* cited by examiner

*Primary Examiner*—Kevin Hurley  
(74) *Attorney, Agent, or Firm*—Ulmer & Berne LLP

(57) ABSTRACT

A motorcycle includes a frame, a fork, a from wheel, an upper arm, a lower arm, a handlebar, and a suspension element. The fork is pivotable with respect to the frame about a steering axis. The front wheel is rotatably coupled with the fork. The upper arm and the lower arm are each pivotally coupled with each of the fork and the frame. The handlebar is pivotally coupled with the frame and is configured to facilitate steering of the front wheel. The suspension element is coupled with each of the frame and the fork.

20 Claims, 4 Drawing Sheets

MOTORCYCLES HAVING UPPER AND LOWER ARMS COUPLED WITH FORK AND FRAME

TECHNICAL FIELD

Motorcycles are provided having a front wheel rotatably attached to a fork. Upper and lower arms couple the fork with a frame of the motorcycle.

BACKGROUND

Conventional motorcycles include a fork which rotatably supports and facilitates steering of a front wheel of the motorcycle. On some conventional motorcycles, the fork includes lower fork members which are slidingly received within upper fork members in a telescoping arrangement to provide a cushion for the front wheel of the motorcycle.

SUMMARY

In accordance with one embodiment, a motorcycle comprises a frame, a fork, a front wheel, an upper arm, a lower arm, a handlebar, and a suspension element. The fork is pivotable with respect to the frame about a steering axis. The front wheel is rotatably coupled with the fork. The upper arm and the lower arm are each pivotally coupled with each of the fork and the frame. The handlebar is pivotally coupled with the frame and is configured to facilitate steering of the front wheel. The suspension element is coupled with each of the frame and the fork. The suspension element is selectively compressible along a suspension axis for dampening shocks encountered by the front wheel. The steering axis intersects the suspension axis and the suspension element.

In accordance with another embodiment, a motorcycle comprises a frame, a fork, a front wheel, a handlebar, an upper arm, a lower arm, and a suspension element. The front wheel is rotatably coupled with the fork and has a wheel rotational axis. The handlebar is pivotally coupled with the frame and is configured to facilitate steering of the front wheel. The upper arm extends between a first end and a second end. The first end is pivotally coupled with the fork at a first pivot axis. The second end is pivotally coupled with the frame at a second pivot axis. The lower arm extends between a third end and a fourth end. The third end is pivotally coupled with the fork at a third pivot axis. The fourth end is pivotally coupled with the frame at a fourth pivot axis. The suspension element extends between a fifth end and a sixth end. The fifth end is pivotally coupled with the fork at a fifth pivot axis. The sixth end is pivotally coupled with the frame at a sixth pivot axis. The fifth pivot axis is vertically below the third pivot axis. The sixth pivot axis is vertically below the fourth pivot axis.

In accordance with yet another embodiment, a motorcycle comprises a frame, a fork, a front wheel, an upper arm, a lower arm, a handlebar, and a suspension element. The fork is pivotable with respect to the frame about a steering axis. The front wheel is rotatably coupled with the fork. The upper arm and the lower arm are each pivotally coupled with each of the fork and the frame. The handlebar is pivotally coupled with the frame and is configured to facilitate steering of the front wheel. The suspension element is configured to dampen shocks encountered by the front wheel. The suspension element is coupled with each of the frame and the fork. The lower arm is positioned vertically between the upper arm and the suspension element.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
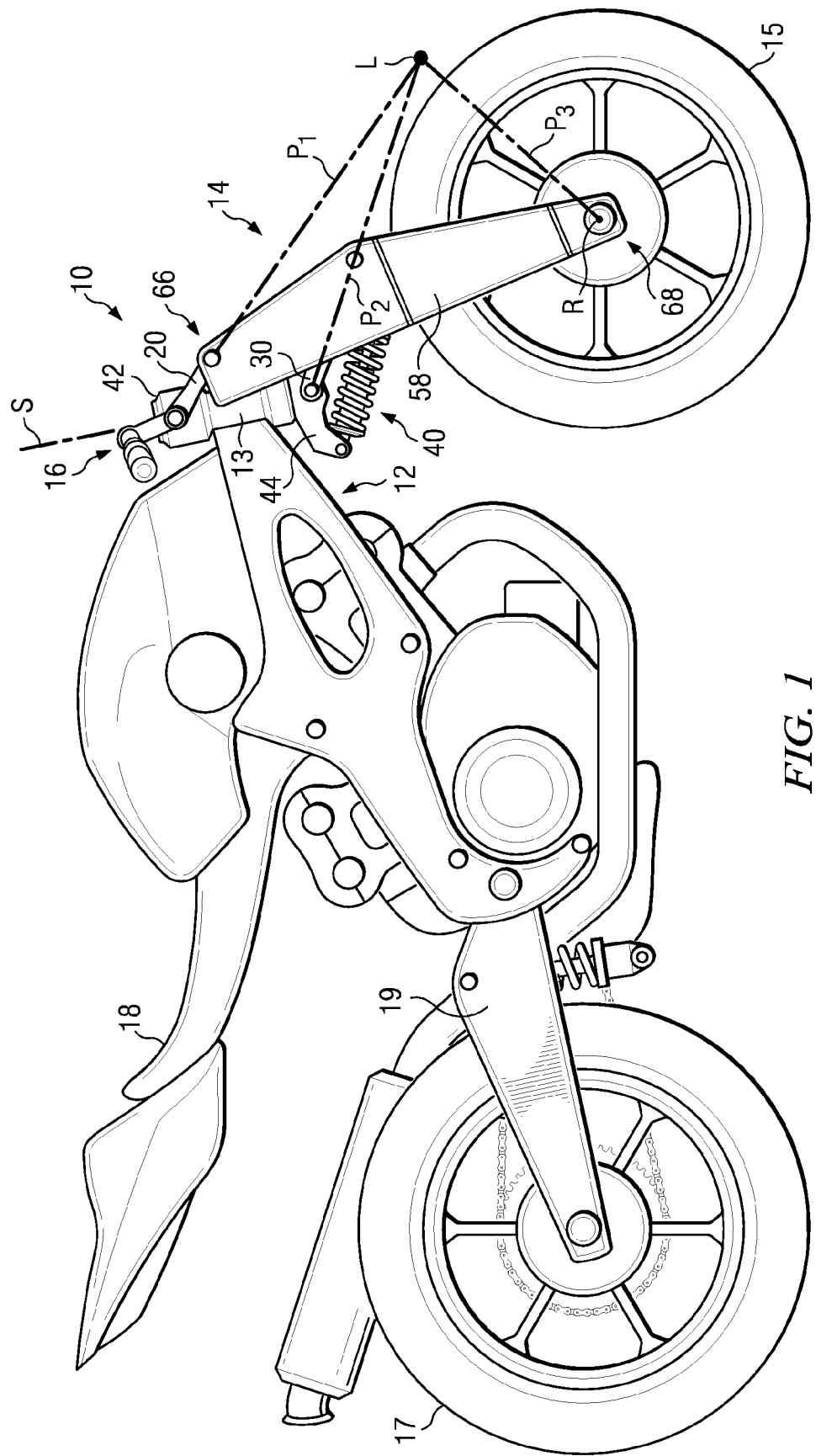
FIG. 1 is a right side elevational view depicting a motorcycle in accordance with one embodiment.

Embodiments are hereinafter described in detail in connection with the views of FIGS. 1-4, wherein like numbers indicate the same or corresponding elements throughout the views. A motorcycle 10 is shown in FIG. 1 to include a frame 12. As described in further detail below, the motorcycle 10 includes a fork 14 which is pivotally attached to the frame 12 such that the fork 14 is pivotable with respect to the frame 12 about a steering axis S. The motorcycle 10 is also shown to comprise a front wheel 15 which is rotatably coupled with the fork 14 such that the front wheel 15 has a rotational axis R. A handlebar 16 can be pivotally coupled with the frame 12 to facilitate steering of the fork 14 and the front wheel 15 by an operator of the motorcycle 10 who is seated upon a seat 18 of the motorcycle 10. The motorcycle 10 can also include a rear swing arm 19 which is pivotally coupled with the frame 12 and which rotatably supports a rear wheel 17. Though the motorcycle 10 is shown to comprise a two-wheeled motor vehicle having a single front wheel (i.e., 15) and a single rear wheel (i.e., 17) and being generally configured for highway use, it will be appreciated that a motorcycle in accordance with alternative embodiments can comprise any of a variety of other types of saddle-type vehicles such as, for example, a scooter or an off-road motorcycle. It will also be appreciated that a motorcycle can alternatively include more than one front and/or rear wheel, and/or can alternatively include a snow skid or other ground interface device in lieu of front and/or rear wheel(s).

The coupling of the frame 12, the fork 14, and the handlebar 16 will now be described in further detail. In particular, the frame 12 is shown to comprise a head tube 13, an upper steering hub 42 and a lower steering hub 44. The handlebar 16 can be attached to the upper steering hub 42. Both of the upper steering hub 42 and the lower steering hub 44 can be configured to pivot together with respect to the head tube 13, and in response to steering of the handlebar 16 by an operator of the motorcycle 10. The upper steering hub 42 is shown to be spaced from the lower steering hub 44. It will be appreciated that bearings and/or bushings (not shown) can be provided to pivotally support the upper steering hub 42 and the lower steering hub 44 with respect to the head tube 13.

The handlebar 16 can be coupled with each of the upper steering hub 42 and the lower steering hub 44 in any of a variety of suitable configurations. In one embodiment, with the handlebar 16 attached to the upper steering hub 42, a spindle (not shown) can pass through a hollow passageway longitudinally defined within the head tube 13 and can rigidly attach (e.g., with splines) to each of the upper steering hub 42 and the lower steering hub 44. In such a configuration, the handlebar 16 is accordingly coupled with the lower steering hub 44 by way of the upper steering hub 42 and the spindle. In another embodiment, with the handlebar 16 attached to the upper steering hub 42, the upper steering hub 42 and the lower steering hub 44 can be provided without any connecting member extending through the head tube 13. However, pivoting one of the upper and lower steering hubs 42, 44 nevertheless results in corresponding pivoting of the other of the upper and lower steering hubs 42, 44 by virtue of their common attachment (by upper and lower arms 20, 30, discussed below) to the fork 14. The handlebar 16 is accordingly coupled with the lower steeling hub 44 by way of the upper steering hub 42 and the fork 14. Since there is accordingly no need for a connecting member (e.g., the above-described spindle) extending directly between the upper and lower steering hubs 42, 44, it will be appreciated that a frame might be provided in an alternative configuration to that shown in FIG. 1, and with a gap or space located between the upper and lower steering hubs. A headlight, radiator, engine control unit, air duct, and/or other feature can be provided at least partially within this gap or space.

Upper and lower arms 20, 30 can be provided for coupling the fork 14 to the frame 12. In one embodiment, such as shown in the embodiment of FIGS. 1-4, the upper arm 20 extends between respective ends 21, 23. The end 23 of the upper arm 20 can be pivotally coupled with the upper steering hub 42 of the frame 12 at a pivot axis $A_2$. The end 21 of the upper arm 20 can be pivotally coupled with the fork 14 at a pivot axis $A_1$. Likewise, the lower arm 30 extends between respective ends 31, 33. The end 33 of the lower arm 30 can be pivotally coupled with the lower steering hub 44 of the frame 12 at a pivot axis $A_4$. The end 31 of the lower arm 30 can be pivotally coupled with the fork 14 at a pivot axis $A_3$. The first pivot axis $A_1$ and the second pivot axis $A_2$ are shown to together define a first plane $P_1$.

The fork 14 can extend from an upper end 66 to a lower end 68. The pivot axis $A_1$ is shown to be adjacent to the upper end 66 of the fork 14. The rotational axis R of the front wheel 15 is shown to be adjacent to the lower end 68 of the fork 14. In the embodiment of FIGS. 1-4, the pivot axis $A_3$ is shown to be disposed vertically between the pivot axis $A_1$ and the rotational axis R of the front wheel 14. In one embodiment, such as shown in FIG. 4, the upper and lower arms 20, 30 might not be parallel with one another such that the first plane $P_1$ can intersect the second plane $P_2$ to define a line L. In one embodiment, such as shown in FIG. 4, the line L can be coplanar (e.g., within a third plane $P_3$ shown in FIG. 1) with the rotational axis R of the front wheel 15.

In one embodiment, the upper arm 20 can include an upper left member 22, an upper right member 24, and an upper cross-member 26 connecting the upper left member 22 and the upper right member 24. The end 23 of the upper arm 20 is shown to straddle the upper steering hub 42 such that the upper left and right members 22, 24 are oppositely disposed with respect to the upper steering hub 42. The upper left and right members 22, 24 can be pivotally coupled with the upper steering hub 42 such that the upper arm 20 can pivot about the pivot axis $A_2$ with respect to the upper steering hub 42. Portions of the upper left and right members 22, 24 adjacent to the end 21 of the upper arm 20 can be pivotally coupled about the pivot axis $A_1$ with respective left and right fork members 56, 58 of the fork 14. It will be appreciated that the upper cross-member 26 can help, during use of the motorcycle 10, to maintain the left and right members 22, 24 generally parallel with one another.

Figure 2:
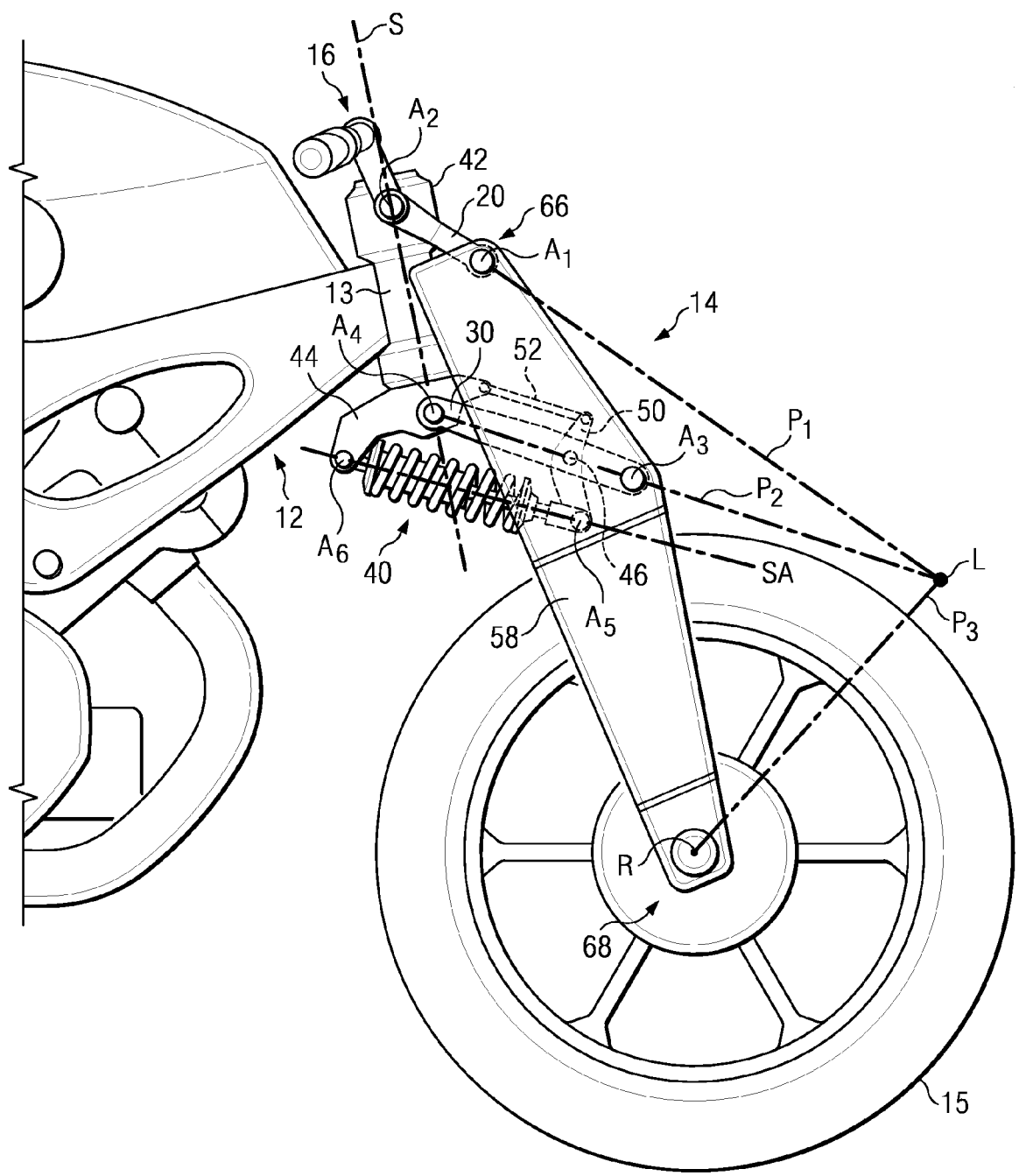
FIG. 2 is an enlarged right side elevational view depicting a portion of the motorcycle of FIG. 1, wherein certain hidden components and portions thereof are depicted in dashed lines.
Figure 3:
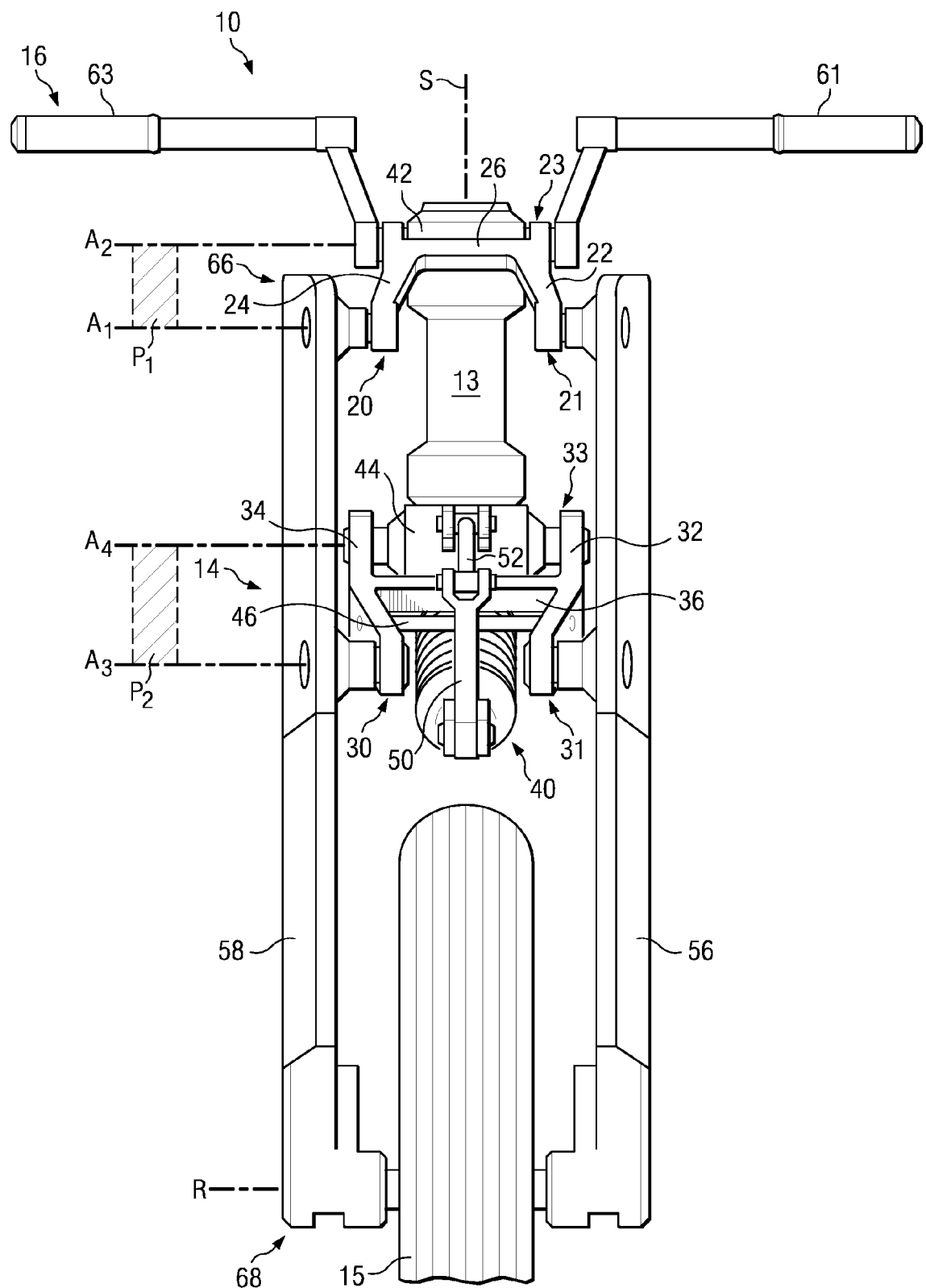
FIG. 3 is an enlarged front elevational view depicting a portion of the motorcycle of FIG. 1.
Figure 4:
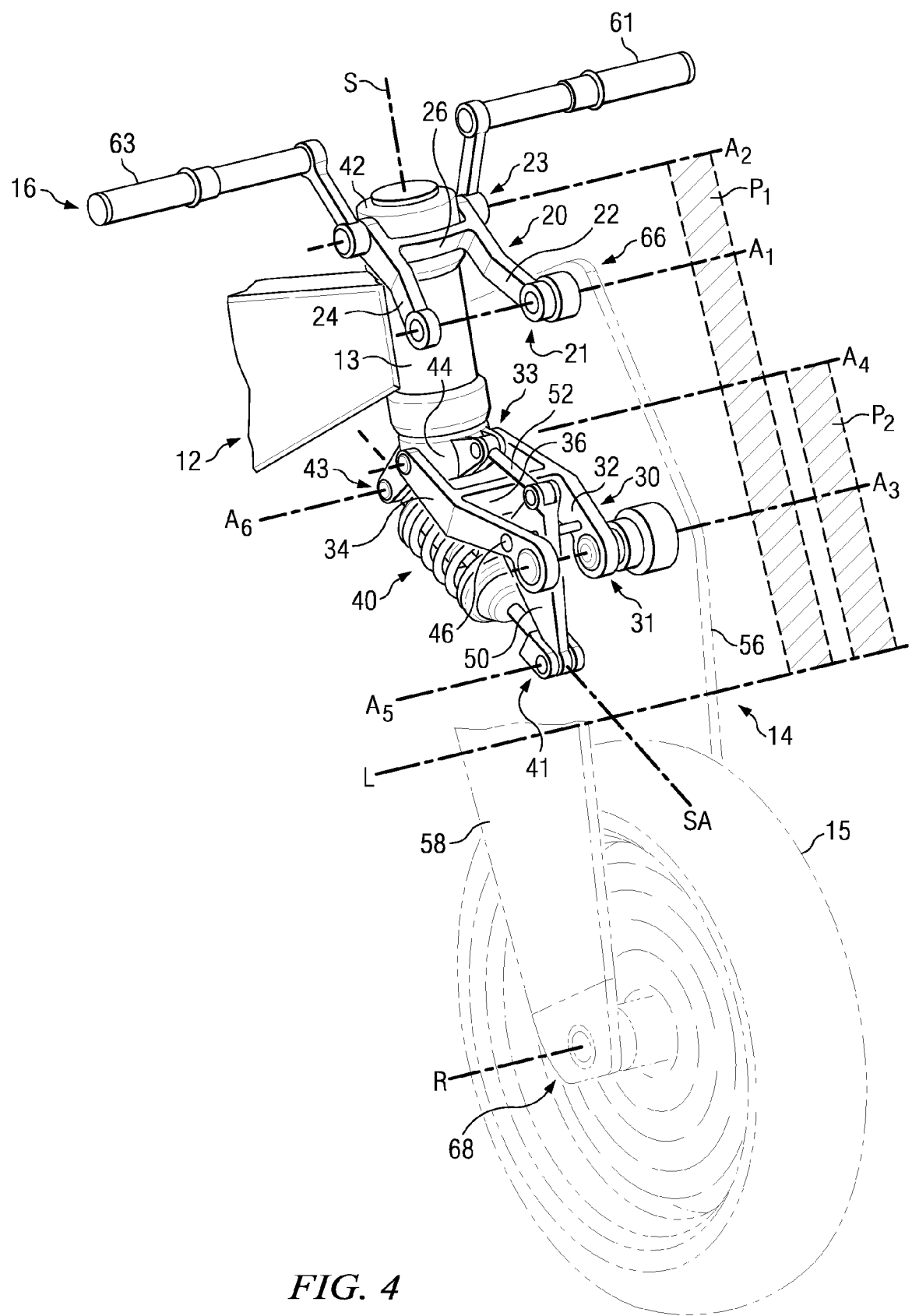
FIG. 4 is an enlarged perspective view depicting certain components of the motorcycle of FIG. 1, wherein certain other components have been removed for clarity of illustration.

The handlebar 16 is shown in FIGS. 3-4 to include a left grip portion 61 and a right grip portion 63 which are suitable for grasping by respective left and right hands of an operator during use of the motorcycle 10. The left and right grip portions 61, 63 are shown to be attached to opposite sides of the upper steering hub 42. Though, in the embodiment of FIGS. 1-4, the upper arm 20 is pivotal during use of the motorcycle 10 with respect to the upper steering hub 42 (i.e., about the pivot axis $A_2$), it will be appreciated that the position of the left and right grip portions 61, 63 of the handlebar 16 can be fixed with respect to the upper steering hub 42 during use of the motorcycle 10 to facilitate effective steering of the motorcycle 10 by the operator. It will also be appreciated that a handlebar can be attached or coupled with upper and lower steering hubs in any of a variety of other suitable arrangements or configurations.

Like the upper arm 20 discussed above, the lower arm 30 can include a lower left member 32, a lower right member 34, and a lower cross-member 36 connecting the lower left member 32 and the lower right member 34. The end 33 of the lower arm 30 is shown to straddle the lower steering hub 44 such that the lower left and right members 32, 34 are oppositely disposed with respect to the lower steering hub 44. The lower left and right members 32, 34 can be pivotally coupled with the lower steering hub 44 such that the lower arm 30 can pivot about the pivot axis $A_4$ with respect to the lower steering hub 44. Portions of the lower left and right members 32, 34 adjacent to the end 31 of the lower arm 30 can be pivotally coupled with the respective left and right fork members 56, 58 of the fork 14 to facilitate pivoting of the lower arm 30 with respect to the fork 14 about the pivot axis $A_3$. It will also be appreciated that the lower cross-member 36 can help, during use of the motorcycle 10, to maintain the left and right members 32, 34 generally parallel with one another. It will be appreciated that, together, the tipper and lower cross-members 26, 36 can help to maintain the left and right fork members 56, 58 of the fork 14 generally parallel with one another.

The motorcycle 10 can also include a suspension element 40 which is configured to dampen shocks encountered by the front wheel 15 from being passed along from the fork 14 to the frame 12 during use of the motorcycle 10. In one embodiment, the suspension element 40 can comprise a shock, a spring, a strut, any of a variety of other suitable components, and/or any of a variety of suitable combinations thereof. In order to facilitate dampening of shocks encountered by the front wheel 15, it will be appreciated that the suspension element 40 can be coupled with each of the frame 12 and the fork 14. For example, as best shown in FIGS. 2 and 4, the suspension element 40 can extend between respective ends 41, 43. The end 43 of the suspension element 40 can be pivotally coupled with the lower steering hub 44 of the frame 12 at a pivot axis $A_6$. The end 41 of the suspension element 40 can be pivotally coupled with the fork 14 at a pivot axis $A_5$. In particular, the end 41 of the suspension element 40 can be pivotally coupled with a linking arm 50 at the pivot axis $A_5$. The linking arm 50 can be pivotally coupled with the lower arm 30 (e.g., by a pin 46) and the lower arm 30 can be pivotally coupled with the fork 14 at the pivot axis $A_3$. In one embodiment, a push rod 52 can be pivotally coupled with each of the lower steering hub 44 and the linking arm 50. In this configuration, it can be seen that the pivot axis $A_5$ is vertically below the pivot axis $A_3$, and the pivot axis $A_6$ is vertically below the pivot axis $A_4$. Accordingly, the lower arm 30 is shown to be positioned vertically between the upper arm 20 and the suspension element 40, and such that no portion of the suspension element 40 is disposed vertically between the upper arm 20 and the lower arm 30. It will be appreciated that the manner in which the suspension element 40 applies dampening force to the fork 14 can be varied by altering one or more of the configurations of the suspension element 40, the linking arm 50, and the push rod 52. It will also be appreciated that the suspension element 40 as provided in the arrangement of FIGS. 1-4 can, during use of the motorcycle 10, achieve progressive dampening of the fork 14 with respect to the frame 12.

In the embodiment of FIGS. 1-4, it can be seen that, during use of the motorcycle 10, and in response to terrain impacts encountered by the front wheel 15, the suspension element 40 can be selectively compressed along a suspension axis SA (see FIGS. 2-4). By compressing the suspension element 40 along the suspension axis SA, it will be appreciated that the suspension element 40 can effectively dampen shocks encountered by the front wheel 15. In one embodiment, such as shown in FIGS. 2 and 4, the suspension axis SA, and thus the suspension element 40, can incline upwardly while following a direction extending from a forward end of the motorcycle 10 to a rearward end of the motorcycle 10. As also shown in FIGS. 2 and 4, the suspension element 40 can be positioned such that the steering axis S intersects both the suspension axis SA and the suspension element 40. By positioning the suspension element 40 below the lower arm 30 as shown in FIGS. 1-4, it will be appreciated that the motorcycle 10 can have a lower center of gravity than certain conventional motorcycles, and can accordingly have improved performance characteristics.

It will also be appreciated that the provision and configuration of the suspension element 40 of FIGS. 1-4 facilitates dampening of the fork 14, and without any need for any portion of the fork 14 to be telescopingly received within any other portion of the fork 14. Such a telescoping relationship among fork portions is common of many conventional motorcycles and can impose certain design restrictions as to the shape, size, weight, and constituent materials of a fork. Because the fork 14 does not include any telescoping portions, it will be appreciated that any of a wide variety of materials, or combinations thereof, can be used to form the left and right fork members 56, 58 of the fork 14, and that the left and right fork members 56, 58 can be provided to have any of a variety of suitable shapes and configurations. For example, in one embodiment, the left and right fork members can be substantially constructed from carbon fiber material, but with certain metal reinforcement components, thus forming a hybrid construction which exhibits superior strength, styling, and weight characteristics as compared with certain conventional fork designs. In an alternative embodiment, the left and right fork members can additionally or alternatively comprise metal, plastic, fiberglass, and/or any of a variety of other materials provided in any of a variety of suitable alternative shapes and configurations.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will lie understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A motorcycle comprising:
    a frame;
    a fork;
    a steering hub pivotally coupled to the frame and pivotable with respect to the frame about a steering axis;
    a front wheel rotatably coupled with the fork;
    an upper arm and a lower arm, each pivotally coupled with each of the fork and the steering hub;
    a handlebar coupled with the steering hub and configured to facilitate steering of the front wheel relative to the frame; and
    a suspension element configured to dampen shocks encountered by the front wheel, wherein the suspension element is coupled with each of the steering hub and the fork, the suspension element is selectively compressible along a suspension axis, and the steering axis intersects the suspension axis and the suspension element.

2. The motorcycle of claim 1 wherein the suspension axis inclines upwardly while following a direction extending from a forward end of the motorcycle to a rearward end of the motorcycle.

3. The motorcycle of claim 1 wherein no portion of the suspension element is disposed vertically between the upper arm and the lower arm.

4. The motorcycle of claim 1 wherein the frame comprises an upper steering hub and a lower steering hub, each being coupled with the handlebar, the upper steering hub is spaced from the lower steering hub, the upper arm is pivotally coupled with the upper steering hub, and the lower arm is pivotally coupled with the lower steering hub.

5. A motorcycle comprising:
    a frame;
    a steering hub pivotally coupled to the frame and pivotable with respect to the frame about a steering axis;
    a fork;
    an upper arm and a lower arm, each pivotally coupled with each of the fork and the steering hub;
    a front wheel rotatably coupled with the fork;
    a handlebar coupled with the steering hub and configured to facilitate steering of the front wheel relative to the frame;
    a suspension element configured to dampen shocks encountered by the front wheel:
    a linking arm; and
    a push rod, wherein:
    the linking arm is pivotally coupled with each of the suspension element and the lower arm;
    the push rod is pivotally coupled with each of the lower steering hub and the linking arm;
    the suspension element is coupled with each of the steering hub and the fork;
    the lower arm is positioned vertically between the upper arm and the suspension element; and
    the steering hub comprises an upper steering hub and a lower steering hub, each being coupled with the handlebar, the upper steering hub is spaced from the lower steering hub, the upper arm is pivotally coupled with the upper steering hub, and the lower arm is pivotally coupled with the lower steering hub.

6. The motorcycle of claim 5 wherein the suspension element is selectively compressible along a suspension axis, and wherein the suspension axis inclines upwardly while following a direction extending from a forward end of the motorcycle to a rearward end of the motorcycle.

7. The motorcycle of claim 5 wherein the suspension element is selectively compressible along a suspension axis, and wherein the steering axis intersects the suspension axis and the suspension element.

8. The motorcycle of claim 5 wherein:
the upper arm comprises an upper left member, an upper right member, and an upper cross-member connecting the upper left member and the upper right member; and
the lower arm comprises a lower left member, a lower right member, and a lower cross-member connecting the lower left member and the lower right member.

9. A motorcycle comprising:
a frame;
a steering hub pivotally coupled to the frame and pivotable with respect to the frame about a steering axis;
a fork;
an upper arm and a lower arm, each pivotally coupled with each of the fork and the steering hub;
a front wheel rotatably coupled with the fork;
a handlebar coupled with the steering hub and configured to facilitate steering of the front wheel relative to the frame; and
a suspension element configured to dampen shocks encountered by the front wheel; wherein:
the suspension element is coupled with each of the steering hub and the fork;
the lower arm is positioned vertically between the upper arm and the suspension element:
the upper arm extends between a first end and a second end, the first end is pivotally coupled with the fork at a first pivot axis, the second end is pivotally coupled with the steering hub at a second pivot axis, the first pivot axis and the second pivot axis together define a first plane, the lower arm extends between a third end and a fourth end, the third end is pivotally coupled with the fork at a third pivot axis, the fourth end is pivotally coupled with the steering hub at a fourth pivot axis, the third pivot axis and the fourth pivot axis together define a second plane, and the first plane intersects the second plane to define a line coplanar with a rotational axis of the front wheel.

10. The motorcycle of claim 9 wherein the fork extends from an upper end to a lower end, the first pivot axis is adjacent to the upper end of the fork, the rotational axis of the front wheel is adjacent to the lower end of the fork, and the third pivot axis is disposed vertically between the first pivot axis and the rotational axis of the front wheel.

11. The motorcycle of claim 9 wherein the suspension element extends between a fifth end and a sixth end, the fifth end is pivotally coupled with the fork at a fifth pivot axis, the sixth end is pivotally coupled with the steering hub at a sixth pivot axis, the fifth pivot axis is vertically below the third pivot axis, and the sixth pivot axis is vertically below the fourth pivot axis.

12. The motorcycle of claim 9 wherein the suspension element is selectively compressible along a suspension axis, and wherein the suspension axis inclines upwardly while following a direction extending from a forward end of the motorcycle to a rearward end of the motorcycle.

13. The motorcycle of claim 9 wherein the suspension element is selectively compressible along a suspension axis, and wherein the steering axis intersects the suspension axis and the suspension element.

14. The motorcycle of claim 9 wherein the steering hub comprises an upper steering hub and a lower steering hub, each being coupled with the handlebar, the upper steering hub is spaced from the lower steering hub, the upper arm is pivotally coupled with the upper steering hub, and the lower arm is pivotally coupled with the lower steering hub.

15. The motorcycle of claim 9 wherein:
the upper arm comprises an upper left member, an upper right member, and an upper cross-member connecting the upper left member and the upper right member; and
the lower arm comprises a lower left member, a lower right member, and a lower cross-member connecting the lower left member and the lower right member.

16. A motorcycle comprising:
a frame;
a steering hub pivotally coupled to the frame and pivotable with respect to the frame about a steering axis;
a fork;
an upper arm and a lower arm, each pivotally coupled with each of the fork and the steering hub;
a front wheel rotatably coupled with the fork;
a handlebar coupled with the steering hub and configured to facilitate steering of the front wheel relative to the frame; and
a suspension element configured to dampen shocks encountered by the front wheel; wherein:
the suspension element is coupled with each of the steering hub and the fork;
the lower arm is positioned vertically between the upper arm and the suspension element;
the upper arm comprises an upper left member, an upper right member, and an upper cross-member connecting the upper left member and the upper right member; and
the lower arm comprises a lower left member, a lower right member, and a lower cross-member connecting the lower left member and the lower right member.

17. The motorcycle of claim 16 wherein the suspension element is selectively compressible along a suspension axis, and wherein the suspension axis inclines upwardly while following a direction extending from a forward end of the motorcycle to a rearward end of the motorcycle.

18. The motorcycle of claim 16 wherein the suspension element is selectively compressible along a suspension axis, and wherein the steering axis intersects the suspension axis and the suspension element.

19. The motorcycle of claim 16 wherein the steering hub comprises an upper steering hub and a lower steering hub, each being coupled with the handlebar, the upper steering hub is spaced from the lower steering hub, the upper arm is pivotally coupled with the upper steering hub, and the lower arm is pivotally coupled with the lower steering hub.

20. The motorcycle of claim 16 wherein no portion of the suspension element is disposed vertically between the upper arm and the lower arm.

* * * * *

UNITED STATES PATENT AND TRADEMARK OFFICE
CERTIFICATE OF CORRECTION

PATENT NO. : 7,896,379 B2  
APPLICATION NO. : 12/254885  
DATED : March 1, 2011  
INVENTOR(S) : Daisuke Nagao et al.

Page 1 of 1

It is certified that error appears in the above-identified patent and that said Letters Patent is hereby corrected as shown below:

Column 3, line 18, change "steeling hub 44" to -- steering hub 44 --;
Column 4, line 39, change "tipper" to -- upper --;
Column 5, line 3, change "clement" to -- element --;
Column 5, line 62, change "lie" to -- be --;
Claim 5, column 6, line 48, change "wheel:" to -- wheel; --;
Claim 5, column 6, line 50, change "push rod," to -- push rod; --; and
Claim 9, column 7, line 30, change "element:" to -- element; --.

Signed and Sealed this
Twenty-sixth Day of April, 2011

David J. Kappos
*Director of the United States Patent and Trademark Office*